No. 654,348.　　　　　　　　　　　　　　　　　Patented July 24, 1900.
E. G. JOHNSON.
TROLLEY HARP.
(Application filed Feb. 16, 1900.)
(No Model.)
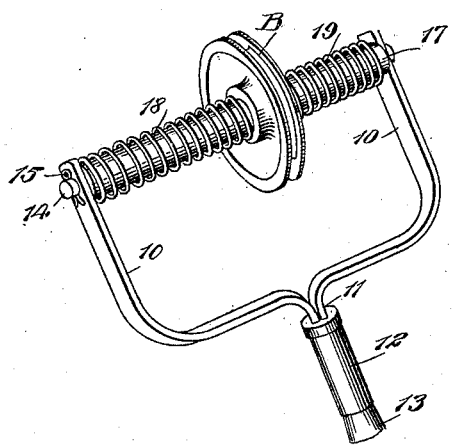
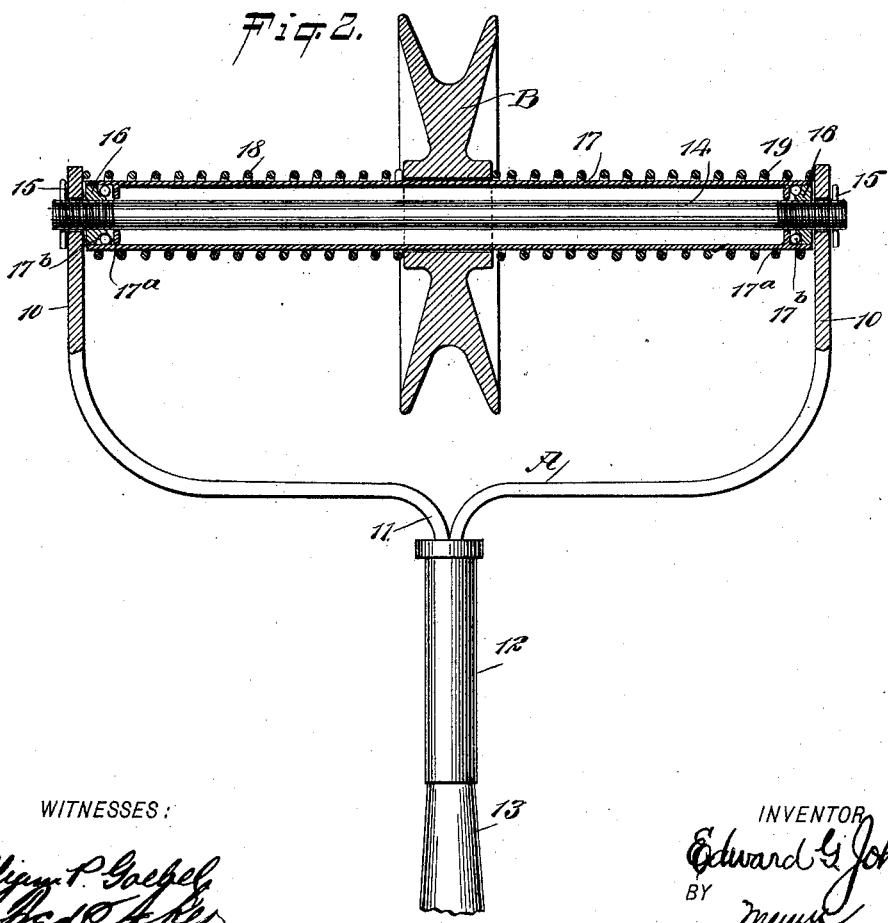
WITNESSES:　　　　　　　　　　　　　　　　　INVENTOR
　　　　　　　　　　　　　　　　　　　　　　　Edward G. Johnson
　　　　　　　　　　　　　　　　　　　　　　BY
　　　　　　　　　　　　　　　　　　　　　　　ATTORNEYS

UNITED STATES PATENT OFFICE.

EDWARD G. JOHNSON, OF BRIGANTINE, NEW JERSEY, ASSIGNOR TO THE EDISON-JOHNSON ELECTRICAL MANUFACTURING COMPANY, OF NEW YORK.

TROLLEY-HARP.

SPECIFICATION forming part of Letters Patent No. 654,348, dated July 24, 1900.

Application filed February 16, 1900. Serial No. 5,473. (No model.)

*To all whom it may concern:*

Be it known that I, EDWARD G. JOHNSON, a citizen of the United States, and a resident of Brigantine, in the county of Atlantic and State of New Jersey, have invented a new and Improved Trolley-Harp, of which the following is a full, clear, and exact description.

One purpose of the invention is to provide a trolley-harp so made that the trolley-wheel may freely move in direction of either arm or member of the harp.

Another purpose of the invention is to so mount the trolley-wheel that when it is relieved from side pressure at its periphery the wheel will be automatically returned to a central position between the members of the harp.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a perspective view of the improved device; and Fig. 2 is a vertical section through the upper portion of the harp and the trolley-wheel, drawn upon an enlarged scale.

The harp A is provided with the usual upright members 10 and with a central downwardly-extending shank 11, which shank is attached to a socket 12, and the socket 12 is arranged to receive a trolley-pole 13. A shaft 14 extends through the members 10 of the harp A, and preferably the end portions of the shaft 14 are exteriorly threaded; but the shaft is usually held in position in the harp by means of cotter-pins 15, passed through the extremities of the shaft outside of the said members 10, as shown particularly in Fig. 4. Ball-races 16 are located upon the threaded portions of the shaft 14 within the harp and close to the members 10 thereof, as is particularly shown in Fig. 2. A tubular shaft 17 is mounted upon the peripheral portions of the ball-races 16, and the said tubular shaft extends from the inner face of one member 10 of the harp to the inner face of the opposing member, as is also shown in Fig. 2. The tubular shaft 17 is provided with flanges $17^a$, which are adjacent to the ball-races, and balls or rollers $17^b$ are placed upon the ball-races, being prevented from dropping out by the flanges $17^a$. Thus it will be observed that the outer or tubular shaft 17 has a ball-bearing on the inner or fixed shaft 14. The trolley-wheel B, which may be of any desired construction, is loosely mounted upon the outer or tubular shaft 17 and is free to slide thereon. Springs 18 and 19, however, are coiled around the tubular shaft 17, engaging with opposite sides of the hub portion of the trolley-wheel B, and the said springs 18 and 19 likewise have bearing against the inner faces of the members 10 of the harp A. These springs have normally an even tension on the trolley-wheel, holding the wheel normally in a central position on the tubular shaft 17 or in the position shown in Fig. 2. If, however, it is necessary for the trolley-wheel B to move to the right or to the left when a car is turning a curve or is to pass any obstruction, the wheel is free to move in either direction to follow the trolley-wire. When the trolley-wheel moves on the shaft 17, it will compress either the spring 18 or the spring 19, and as soon as a straight line of track is reached the compressed spring will automatically return the trolley-wheel to its central or normal position.

It will be observed that under the construction above set forth there is but little friction, as the outer shaft 17 turns freely on the inner or fixed shaft 14 and the trolley-wheel is free to slide on the outer shaft.

Having thus described my invention, I claim as new and desire to secure by Letters Patent—

1. The combination of the trolley-harp, the shaft journaled thereon, the trolley-wheel mounted to turn loosely on said shaft and also capable of sliding thereon, and springs bearing against opposite sides of the trolley-wheel and against fixed abutments.

2. The combination of the trolley-harp, the coiled springs bearing with their outer ends against the harp members, the trolley-wheel against which the inner ends of said springs abut, the fixed shaft extending centrally through the coiled springs and the trolley-wheel, and secured to the harp members, and the tubular shaft interposed between the fixed shaft on one hand and the trolley-wheel and springs on the other hand, the wheel being free to turn and slide on said tubular shaft.

3. The combination of the trolley-harp, the coiled springs bearing with their outer ends against the harp members, the trolley-wheel against which the inner ends of said springs abut, the fixed shaft extending centrally through the coiled springs and the trolley-wheel, and secured to the harp members, and the tubular shaft mounted upon ball-bearings upon the fixed shaft and interposed between the latter on one hand and the trolley-wheel and springs on the other hand, the wheel being free to turn and slide on said tubular shaft.

In testimony whereof I have signed my name to this specification in the presence of two subscribing witnesses.

EDWARD G. JOHNSON.

Witnesses:
J. FRED. ACKER,
EVERARD BOLTON MARSHALL.